(12) United States Patent
Tanaka

(10) Patent No.: US 12,524,458 B2
(45) Date of Patent: Jan. 13, 2026

(54) INFORMATION PROCESSING APPARATUS, NON-TRANSITORY COMPUTER READABLE MEDIUM STORING PROGRAM, AND INFORMATION PROCESSING METHOD

(71) Applicant: FUJIFILM BUSINESS INNOVATION CORP., Tokyo (JP)

(72) Inventor: Takumi Tanaka, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 508 days.

(21) Appl. No.: 17/872,454

(22) Filed: Jul. 25, 2022

(65) Prior Publication Data

US 2023/0315782 A1 Oct. 5, 2023

(30) Foreign Application Priority Data

Mar. 29, 2022 (JP) ................................ 2022-052788

(51) Int. Cl.
*G06F 16/535* (2019.01)
*G06F 16/51* (2019.01)

(52) U.S. Cl.
CPC ............ *G06F 16/535* (2019.01); *G06F 16/51* (2019.01)

(58) Field of Classification Search
CPC ...... G06F 16/535; G06F 16/51; G06F 3/0482; G06F 3/0484; G06F 16/93; G06F 3/04817; G06F 16/168; G06F 3/04812; G06F 16/11
See application file for complete search history.

(56) References Cited

U.S. PATENT DOCUMENTS

| 5,134,390 A * | 7/1992 | Kishimoto ............ G06F 1/1601 348/836 |
| 6,101,526 A * | 8/2000 | Mochizuki ......... H04N 1/00217 709/200 |
| 9,286,306 B2 | 3/2016 | Morisawa |
| 2004/0003411 A1* | 1/2004 | Nakai ............... H04N 21/47202 348/E7.071 |
| 2005/0069107 A1* | 3/2005 | Tanaka ................... H04N 7/142 348/E7.079 |
| 2006/0209089 A1* | 9/2006 | Date .................. H04N 1/00453 707/E17.026 |
| 2006/0212455 A1* | 9/2006 | Perry ...................... G06F 16/58 |

(Continued)

FOREIGN PATENT DOCUMENTS

| JP | 2011-129164 A | 6/2011 |
| JP | 5822971 B2 | 11/2015 |

(Continued)

OTHER PUBLICATIONS

May 31, 2023 Search Report issued in European Patent Application No. 22197235.9.

(Continued)

*Primary Examiner* — Jared M Bibbee
(74) *Attorney, Agent, or Firm* — Oliff PLC

(57) ABSTRACT

An information processing apparatus includes a processor configured to: display a reception image to receive instructions of a user for a file to be stored in a storage; and upon receiving the instructions of the user for the reception image, provide guidance for processing which is predetermined for the storage, and is for the file corresponding to the reception image.

14 Claims, 16 Drawing Sheets

(56) References Cited

U.S. PATENT DOCUMENTS

| | | | | |
|---|---|---|---|---|
| 2007/0283293 | A1* | 12/2007 | Nakamura | H04N 1/00233 |
| | | | | 715/811 |
| 2008/0133607 | A1* | 6/2008 | Tanaka | H04N 7/142 |
| 2008/0228732 | A1* | 9/2008 | Morisawa | G06F 16/156 |
| 2011/0273470 | A1* | 11/2011 | Ohba | G06T 3/40 |
| | | | | 345/619 |
| 2012/0070085 | A1* | 3/2012 | Arn | G06F 3/04886 |
| | | | | 348/222.1 |
| 2019/0373129 | A1* | 12/2019 | Kawaguchi | G06F 21/554 |
| 2020/0278996 | A1* | 9/2020 | Mizuno | G06F 3/0482 |
| 2021/0042024 | A1 | 2/2021 | Tsumemitsu | |
| 2021/0191668 | A1 | 6/2021 | Saito | |
| 2022/0044149 | A1* | 2/2022 | Rand | G06V 10/7747 |
| 2024/0212319 | A1* | 6/2024 | Verbeke | G06V 20/70 |

FOREIGN PATENT DOCUMENTS

| | | |
|---|---|---|
| JP | 2020-042594 A | 3/2020 |
| JP | 2021-027539 A | 2/2021 |
| JP | 2021-101319 A | 7/2021 |

OTHER PUBLICATIONS

Dec. 2, 2025 Office Action issued in Japanese Patent Application No. 2022-052788.

* cited by examiner

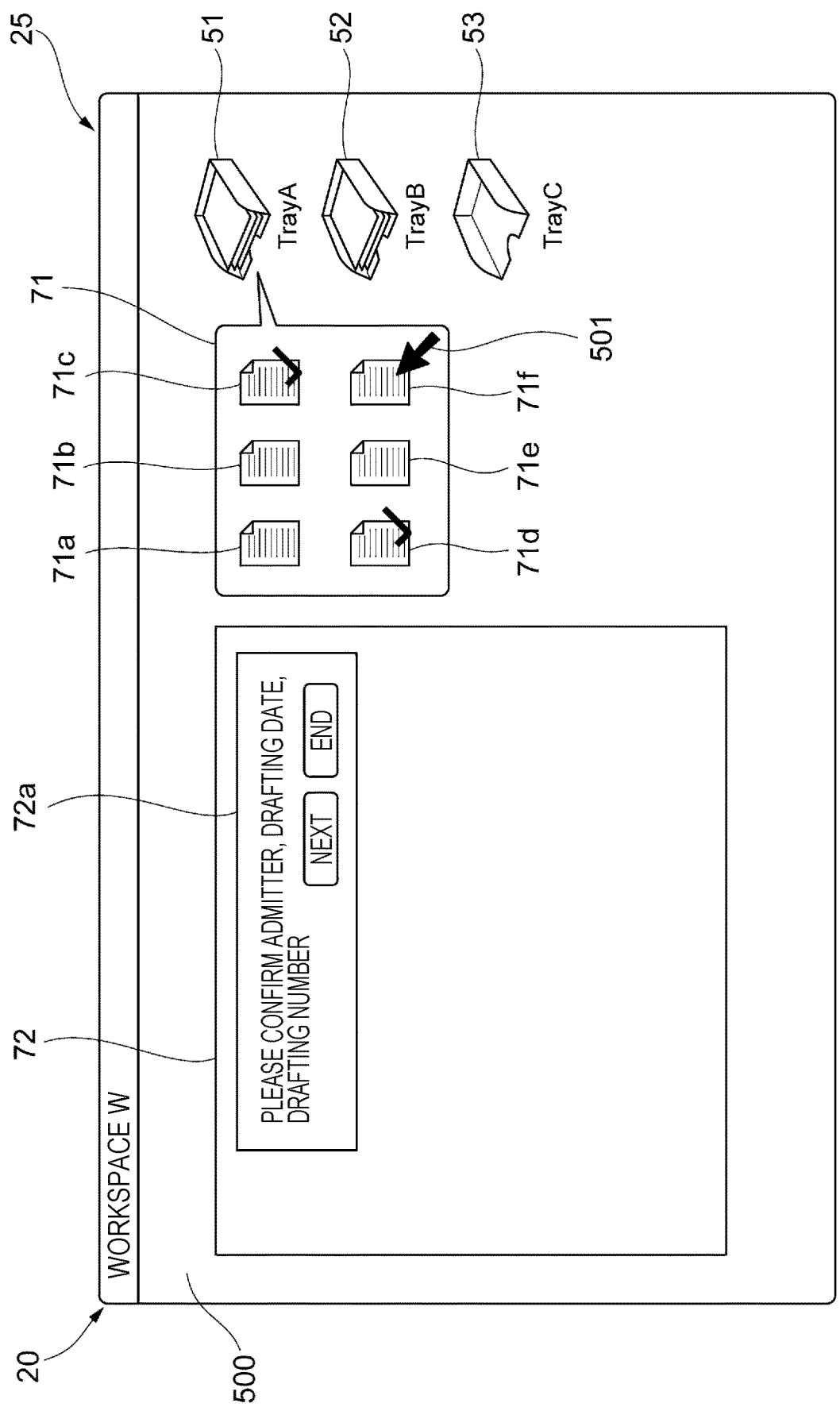

INFORMATION PROCESSING APPARATUS, NON-TRANSITORY COMPUTER READABLE MEDIUM STORING PROGRAM, AND INFORMATION PROCESSING METHOD

CROSS-REFERENCE TO RELATED APPLICATIONS

This application is based on and claims priority under 35 USC 119 from Japanese Patent Application No. 2022-052788 filed Mar. 29, 2022.

BACKGROUND

(i) Technical Field

The present disclosure relates to an information processing apparatus, a non-transitory computer readable medium storing a program, and an information processing method.

(ii) Related Art

For example, Japanese Unexamined Patent Application Publication No. 2011-129164 discloses a configuration in which when the icon of a file is pointed by a pointer, a tooltip including a preview is displayed, the preview showing file information such as updated date/time and the size of the file of interest, and the content of the file of interest. Japanese Patent No. 5822971 discloses an information processing apparatus including a specific processing unit capable of executing specific processing on a file, and a display unit. The information processing apparatus includes a unit that, after execution of specific processing by the specific processing unit on one file selected by a user, causes the display unit to display identification information of the one file, and identification information of the specific processing unit; a unit that, upon selection of the identification information of the one file displayed by the display unit, causes the display unit to display identification information of processing related to the specific processing; a unit that, upon selection by the user of the identification information of the processing which is related to the specific processing and displayed by the display unit, executes processing corresponding to the selected identification information; and a unit that, upon selection by the user of the identification information of the specific processing unit, displayed by the display unit, causes the display unit to display a list including identification information of multiple files for which the specific processing was executed by the specific processing unit in the past.

SUMMARY

When a user performs processing on files stored in a storage, and the user needs to perform a similar operation related to the processing on each of the files, it is difficult to improve the efficiency of operations associated with the processing. Meanwhile, when an operation related to processing is set to files, a setting operation needs to be performed on a newly added file, thus it is difficult to reduce the operational burden of a user.

Aspects of non-limiting embodiments of the present disclosure relate to reducing an operational burden of a user, as compared to when an operation related to processing is set to files.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: display a reception image to receive instructions of a user for a file to be stored in a storage; and upon receiving the instructions of the user for the reception image, provide guidance for processing which is predetermined for the storage, and is for the file corresponding to the reception image.

BRIEF DESCRIPTION OF THE DRAWINGS

Exemplary embodiment of the present disclosure will be described in detail based on the following figures, wherein:

FIG. 16 is a view for explaining a situation in which a document list is displayed.

DETAILED DESCRIPTION

Figure 1:
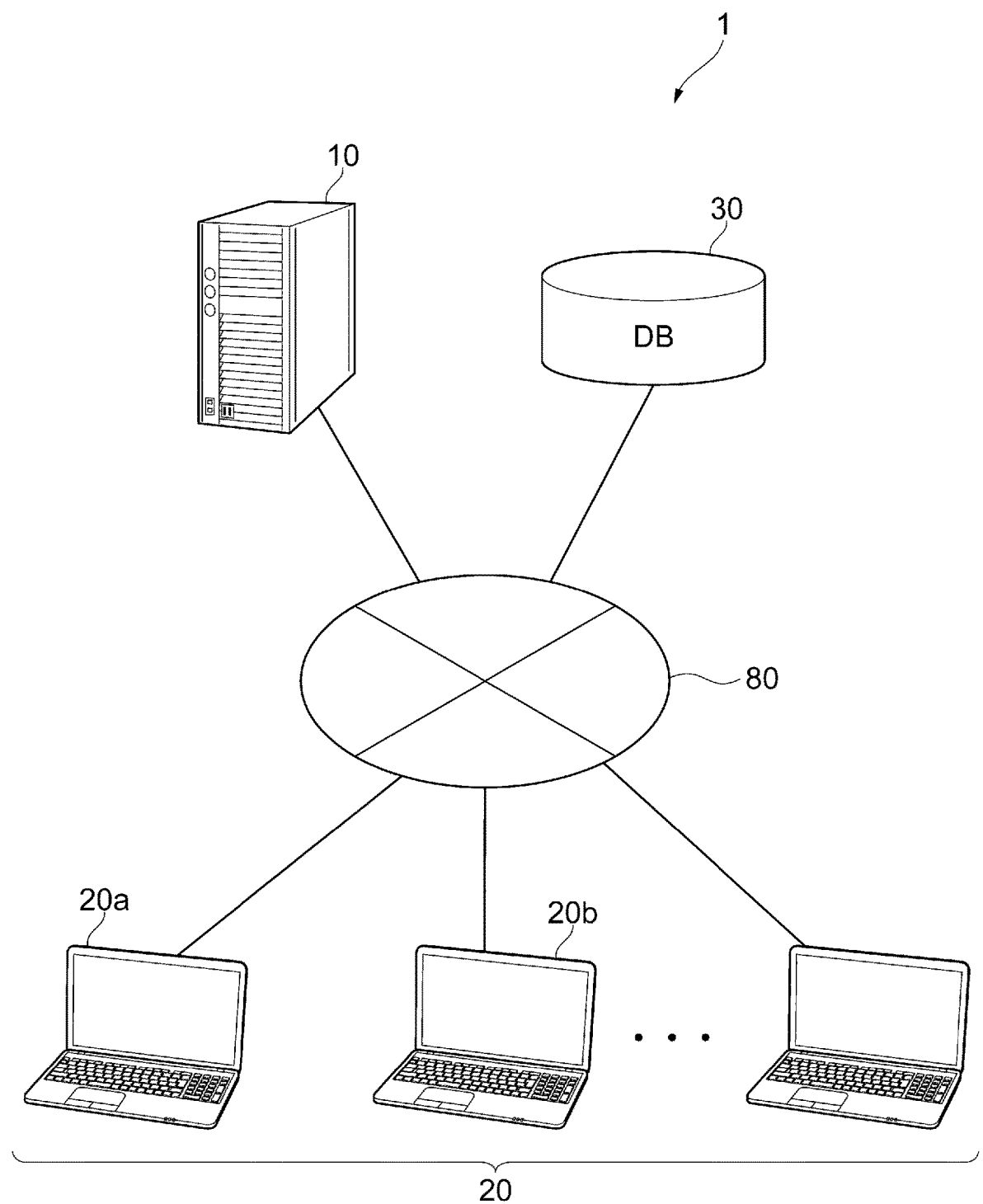
FIG. 1 is a diagram illustrating an entire configuration example of an information processing system according to an exemplary embodiment.

Hereinafter an exemplary embodiment of the present disclosure will be described in detail with reference to the accompanying drawings. FIG. 1 is a diagram illustrating an entire configuration example of an information processing system 1 according to the exemplary embodiment.

The information processing system 1 according to the exemplary embodiment is configurated by coupling a server apparatus 10 that manage files, a terminal apparatus 20 (20a, 20b, . . . ) used by a user to browse files, and a database 30 via a communication line 80.

The communication line 80 is, for example, a line such as a local area network (LAN) and the Internet, and is used for information communication between the server apparatus 10 and the terminal apparatus 20 and between the server apparatus 10 and the database 30. Though the network may be configured to be a composite type of LAN and Internet.

In the information processing system 1 according to the exemplary embodiment, the files uploaded to the server apparatus 10, and stored in the database 30 are browsed and edited at the terminal apparatus 20.

Note that in the exemplary embodiment, a "file" refers to an electronic file stored in the server apparatus 10, the terminal apparatus 20, or the database 30.

The file may include images in addition to characters, or may be comprised of only images without including characters. In addition, the file may include not only document data, and image data, but also information used when document data is converted to an image, and attribute information such as updated date/time, paper size, the number of pages of the file, and keywords in the file.

The server apparatus 10 is an apparatus to manage files uploaded from the terminal apparatus 20. The files to be managed by the server apparatus 10 are stored in the database 30, shared by multiple users, and may be edited by one or multiple users.

The server apparatus 10 is implemented, for example, by a computer apparatus. The server apparatus 10 may be comprised of a single computer, or implemented by distributed processing with multiple computers.

The terminal apparatus 20 is an apparatus to browse or edit the files managed in the server apparatus 10.

The terminal apparatus 20 has a display unit to display an image corresponding to a file. The terminal apparatus 20 includes a computer apparatus. The form of the terminal apparatus 20 includes, for example, a desktop PC, a note PC, a tablet information terminal, a smartphone, and a game device.

The hardware configuration of the server apparatus 10 will be described.

Figure 2:
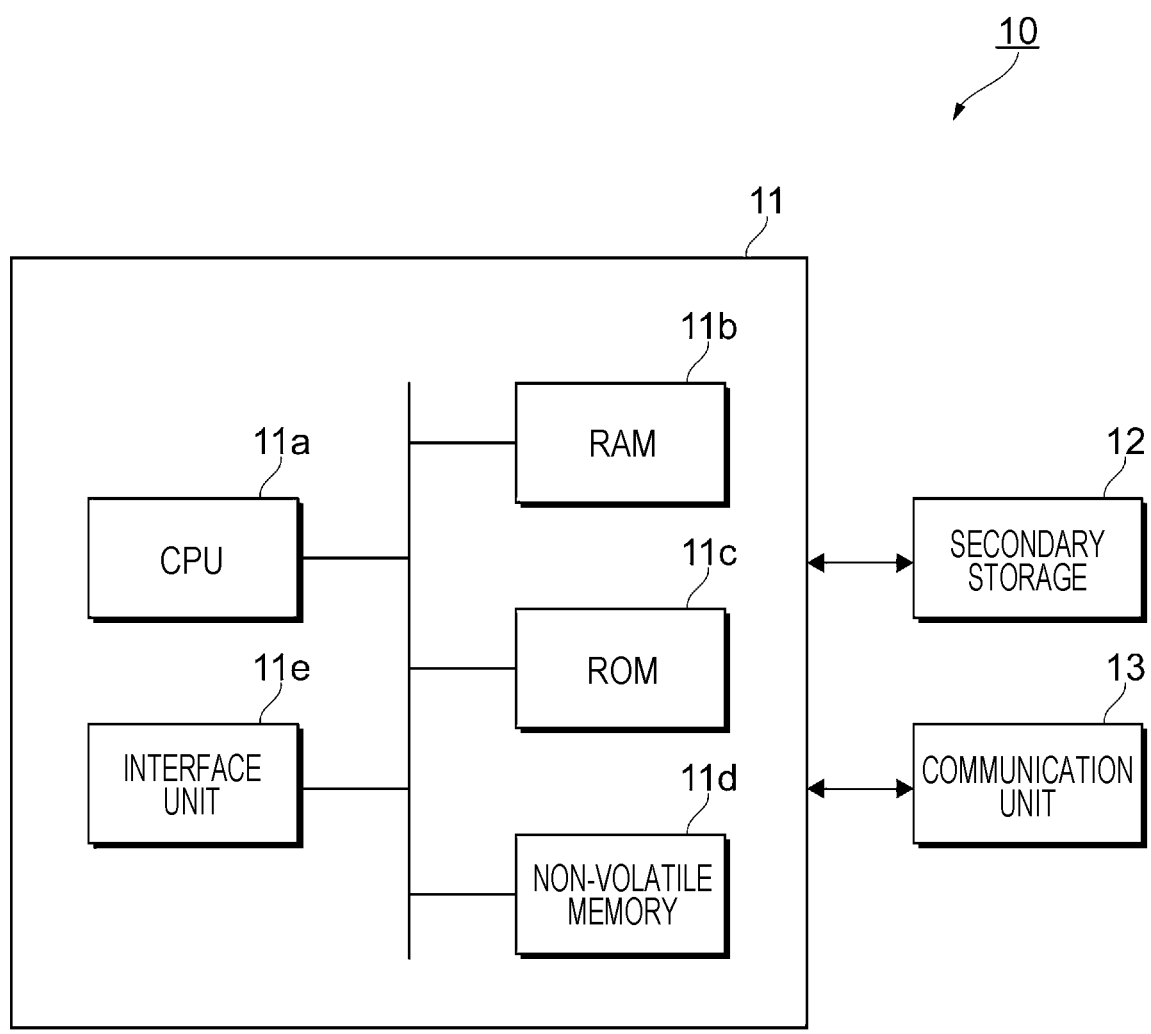
FIG. 2 is a block diagram illustrating an example of a hardware configuration of a server apparatus according to the exemplary embodiment.

FIG. 2 is a block diagram illustrating an example of a hardware configuration of the server apparatus 10 according to the exemplary embodiment.

The server apparatus 10 has an arithmetic processor 11 that executes digital arithmetic processing in accordance with a program to implement the management of files; a secondary storage 12 in which files and the like are recorded; and a communication unit 13 that transmits and receives information via the communication line 80 (see FIG. 1).

The secondary storage 12 is implemented by an existing information storage device, such as a hard disk drive (HDD), a semiconductor memory, and a magnetic tape.

The arithmetic processor 11 is provided with CPU 11*a* as an example of a processor. The CPU 11*a* controls the entire server apparatus 10.

In addition, the arithmetic processor 11 includes RAM 11*b* which is used as a work memory for the CPU 11*a*, and ROM 11*c* which stores programs and the like to be executed by the CPU 11*a*.

The arithmetic processor 11 includes a non-volatile memory 11*d* which is configured to be rewritable and can hold data even when power supply is cut off; and an interface unit 11*e* that controls units such as the communication unit 13 connected to the arithmetic processor 11.

The non-volatile memory 11*d* is comprised of, for example, a SRAM or a flash memory which is backed up by a battery, and the non-volatile memory 11*d* stores information on files and association information by which files are associated with each other.

In addition to files, the secondary storage 12 stores programs to be executed by the arithmetic processor 11.

In the exemplary embodiment, the processing of the server apparatus 10 is executed by the arithmetic processor 11 reading programs stored in the secondary storage 12.

Note that the arithmetic processor 11, the secondary storage 12, and the communication unit 13 are coupled via a bus or a signal line.

In response to a request from the terminal apparatus 20, the server apparatus 10 obtains a new file, extracts a file, associates files with each other, reflects updated content of a file, and executes processing such as access to the database 30.

In addition, in response to a request from the terminal apparatus 20, the server apparatus 10 provides files, a result of search processing, and various kinds of information such as update information to the terminal apparatus 20.

In the exemplary embodiment, the secondary storage 12 stores files and the like. The communication unit 13 receives a request or the like from the terminal apparatus 20, and transmits a required file or the like.

The programs to be executed by the CPU 11*a* installed in the server apparatus 10 may be provided to the server apparatus 10 in a state of being stored in a computer-readable recording medium such as a magnetic recording medium (such as a magnetic tape, a magnetic disk), an optical recording medium (such as an optical disc), a magneto-optical recording medium, and a semiconductor memory. The programs to be executed by the CPU 11*a* may be provided to the server apparatus 10 using a communication unit such as the Internet.

Next, the hardware configuration of the terminal apparatus 20 will be described.

Figure 3:
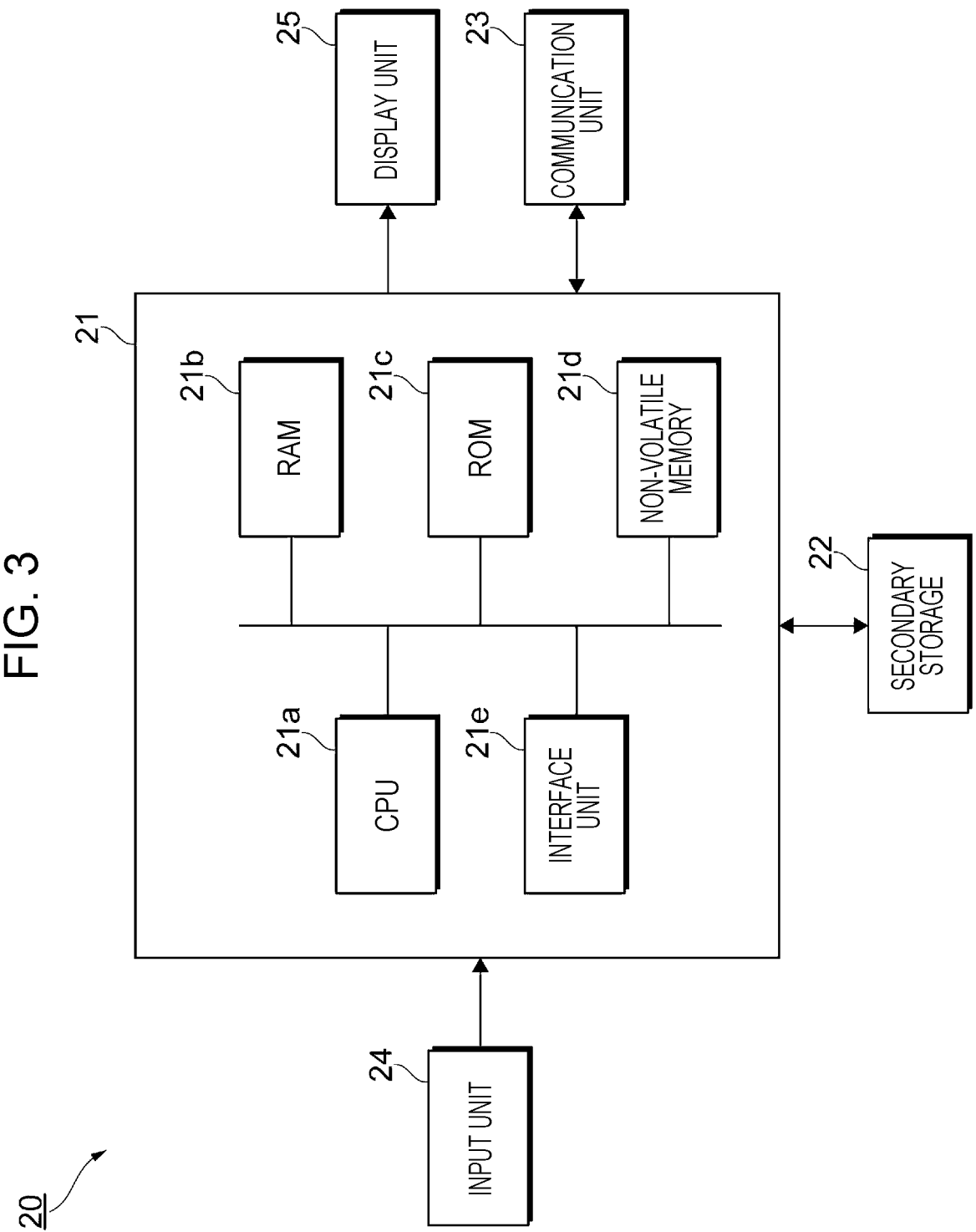
FIG. 3 is a block diagram illustrating an example of a hardware configuration of a terminal apparatus.

FIG. 3 is a block diagram illustrating an example of the hardware configuration of the terminal apparatus 20. The terminal apparatus 20 is an example of an information processing apparatus.

The terminal apparatuses 20 according to the exemplary embodiment each include an arithmetic processor 21 that executes display processing for an image in accordance with a program; a secondary storage 22 in which files and the like are recorded; and a communication unit 23 that transmits and receives information via the communication line 80 (see FIG. 1).

In addition, each of the terminal apparatuses 20 includes an input unit 24 that receives input from a user; and a display unit 25 that displays an image and text information for a user. The display unit 25 is comprised of a liquid crystal display panel or an organic electroluminescent (EL) display panel, for example.

The secondary storage 22 may be implemented by an existing information storage device, such as a hard disk drive (HDD), a semiconductor memory, or a magnetic tape, for example.

The arithmetic processor 21 has a CPU 21*a* as an example of a processor. The CPU 21*a* controls the entire terminal apparatus 20.

In addition, the arithmetic processor 21 includes RAM 21*b* used as a work memory for the CPU 21*a*, and ROM 21*c* which stores programs and the like to be executed by the CPU 21*a*.

The arithmetic processor 21 includes a non-volatile memory 21*d* which is rewritable and can hold data even when power supply is cut off; and an interface unit 21*e* that controls units such as the communication unit 23 connected to the arithmetic processor 21.

The non-volatile memory 21*d* is comprised of, for example, a SRAM or a flash memory which is backed up by a battery, and the non-volatile memory 21*d* stores files, update information and the like.

In addition to files, the secondary storage 22 stores programs to be executed by the arithmetic processor 21. The processing of the terminal apparatus 20 is executed by the arithmetic processor 21 reading programs stored in the secondary storage 22.

Note that the arithmetic processor 21, the secondary storage 22, and the communication unit 23 are coupled via a bus or a signal line.

The input unit 24 is a pointing device or the like which is operated when a user inputs information.

Figure 7:
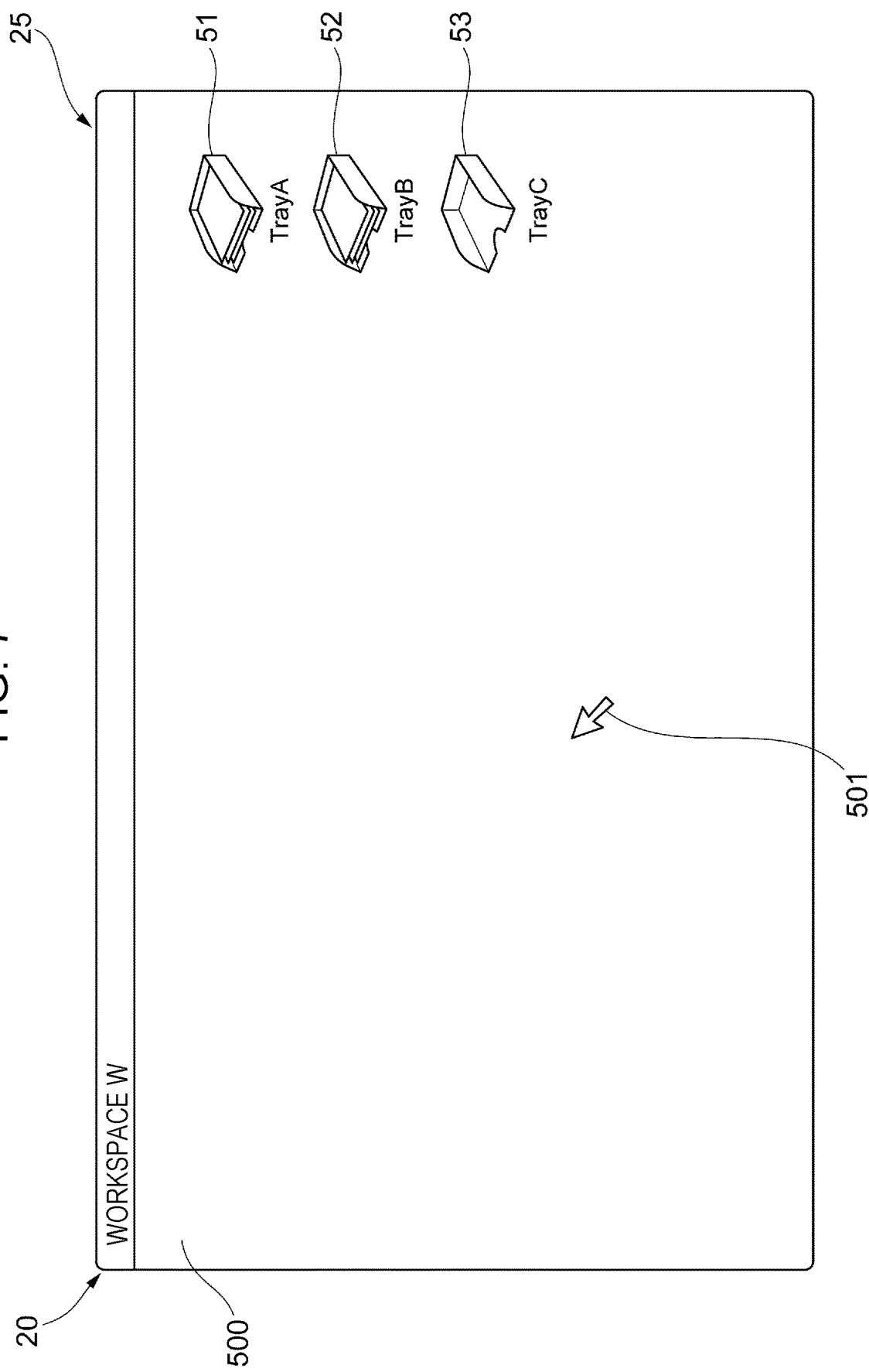
FIG. 7 is a view illustrating a display example of the display unit.

For example, when the input unit 24 is a mouse, a user specifies a position on a display screen displayed on the display unit 25, specifies an image displayed on the display unit 25, and moves the specified image by performing a drag operation and a click operation of cursor 501 (see, for example, FIG. 7).

When the input unit 24 is a touch panel, a user performs an operation of bringing a finger into contact with the touch panel and an operation of moving the finger in contact with the touch panel. Thus, a user can specify a position on a display screen displayed on the display unit 25, specify an image displayed on the display unit 25, and move the specified image.

The terminal apparatus 20 may be provided with a touch panel, and in this case, the input unit 24 and the display unit 25 are provided in an integrated manner.

The input unit 24 may be not only the above-mentioned pointing device, but also a keyboard in which an input operation is performed with keys.

The programs to be executed by the CPU 21*a* installed in the terminal apparatus 20 may be provided to the terminal apparatus 20 in a state of being stored in a computer-readable recording medium such as a magnetic recording medium (such as a magnetic tape, a magnetic disk), an optical recording medium (such as an optical disc), a magneto-optical recording medium, and a semiconductor memory. The programs to be executed by the CPU 21*a* may be provided to the terminal apparatus 20 using a communication unit such as the Internet.

Next, the functional block diagram in the CPU 21*a* of the terminal apparatus 20 will be described.

Figure 4:
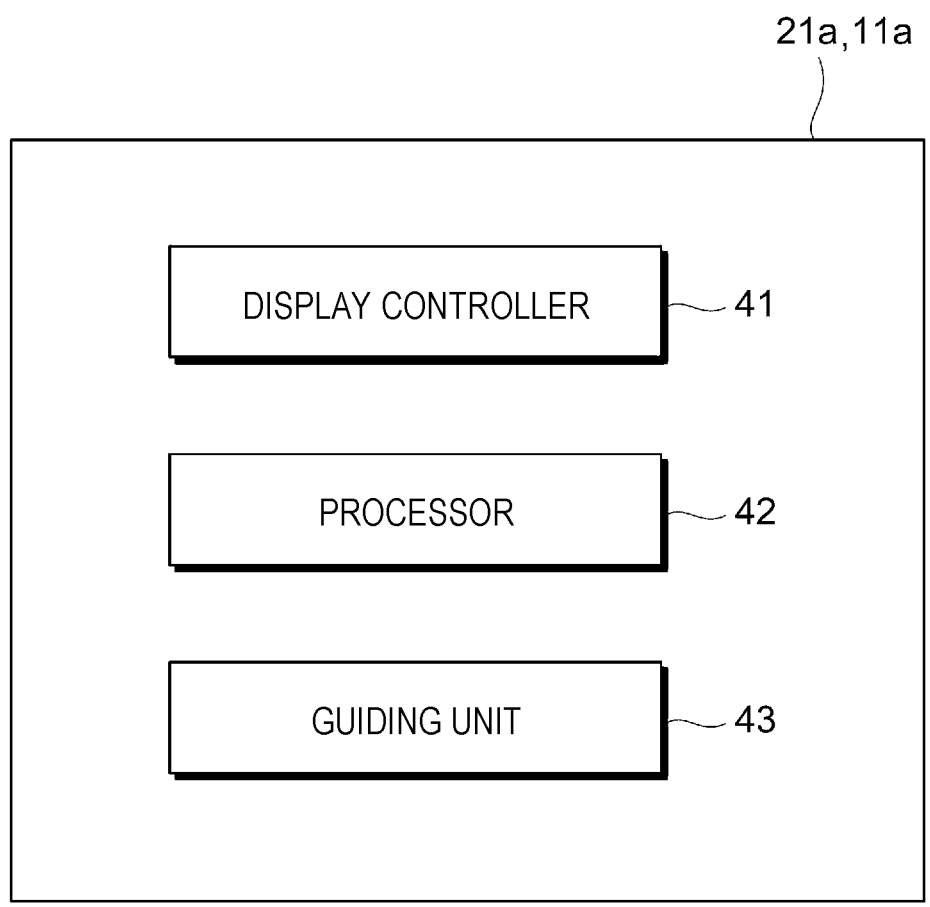
FIG. 4 is a functional block diagram of a CPU.

FIG. 4 is a functional block diagram of the CPU 21*a*. Note that the functional block diagram of FIG. 4 is for the CPU 21*a* of the terminal apparatus 20, however, may be used for the CPU 11*a* of the server apparatus 10.

As illustrated in FIG. 4, the CPU 21*a* includes a display controller 41, a processor 42, and a guiding unit 43.

The display controller 41 controls the display in the display unit 25, for example, the display of workspace 500 (see, for example, FIG. 7) when setting (see FIG. 5) for a tray is made. For example, the display controller 41 controls the display when setting for a tray (see FIG. 8 to FIG. 10) is made in the workspace 500.

In addition, in the workspace 500, the display controller 41 controls the display of notification image 61 (see, for example, FIG. 12), preview of a document in quick view area 62 (see, for example, FIG. 13), and the display of document list area 71 (see FIG. 16).

The processor 42 performs actual internal processing for setting of a tray. Specifically, the processor 42 performs processing for the documents stored in tray icons 51 to 53 (see FIG. 7). For example, the processing is affixing of an electronic seal (see, for example, FIG. 14) to a document displayed in the quick view area 62 of the workspace 500.

When actual processing (see FIG. 6) according to setting is performed, the guiding unit 43 provides guidance for processing for a document in accordance with a workflow. The guidance for the processing is provided by, for example, the display of guidance areas 62*a* to 62*c* (see FIG. 13 to FIG. 15) in the quick view area 62, and the display of guidance area 72*a* (see FIG. 16). The details will be described below.

Next, the case where setting is made for a tray which stores files such as documents, and the actual processing for the setting will be described with reference to FIG. 5 and FIG. 6.

Figure 5:
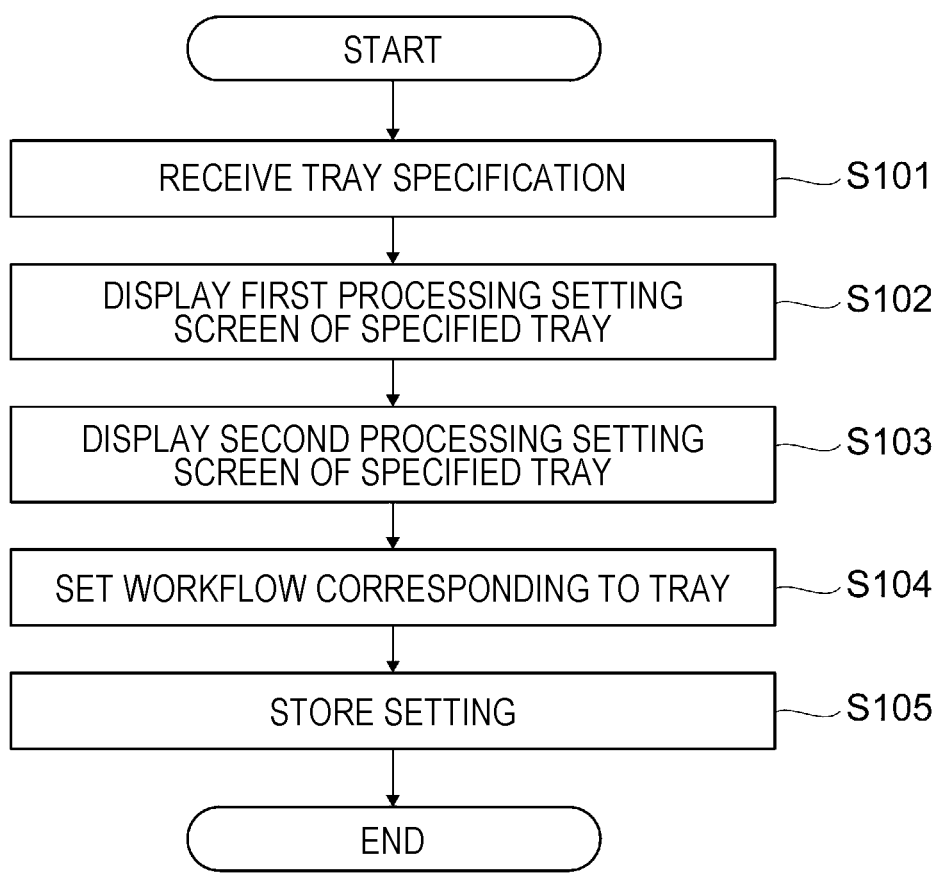
FIG. 5 is a flowchart when a workflow corresponding to a tray icon is set in advance.

FIG. 5 is a flowchart when a workflow corresponding to tray icon 51 is set in advance. Note that skip may be performed in which workflow setting in advance is not made.

In the flowchart illustrated in FIG. 5, when a specification operation is performed on a tray to be set in advance on the display unit 25 (see FIG. 3) of the terminal apparatus 20, the specification operation is received (step 101), and a first processing setting screen for the specified tray is displayed on the display unit 25 (step 102). The first processing setting screen is for setting processing displayed in quick view which displays, for example, a document pointed by cursor 501 (see FIG. 7) on an enlarged scale, and allows the contents to be confirmed by turning pages.

When the first processing setting is completed, the second processing setting screen for a specified tray is displayed (step 103). The second processing setting screen is for setting, for example, processing for which execution is restricted in the quick view.

When the second processing setting is completed, setting for a workflow corresponding to the specified tray is made (step 104), and the setting is stored in the database 30 (see FIG. 1) (step 105). Thus, the specified tray and the setting for the workflow are associated with each other, and the stored workflow is applicable to the files stored in the specified tray.

Figure 6:
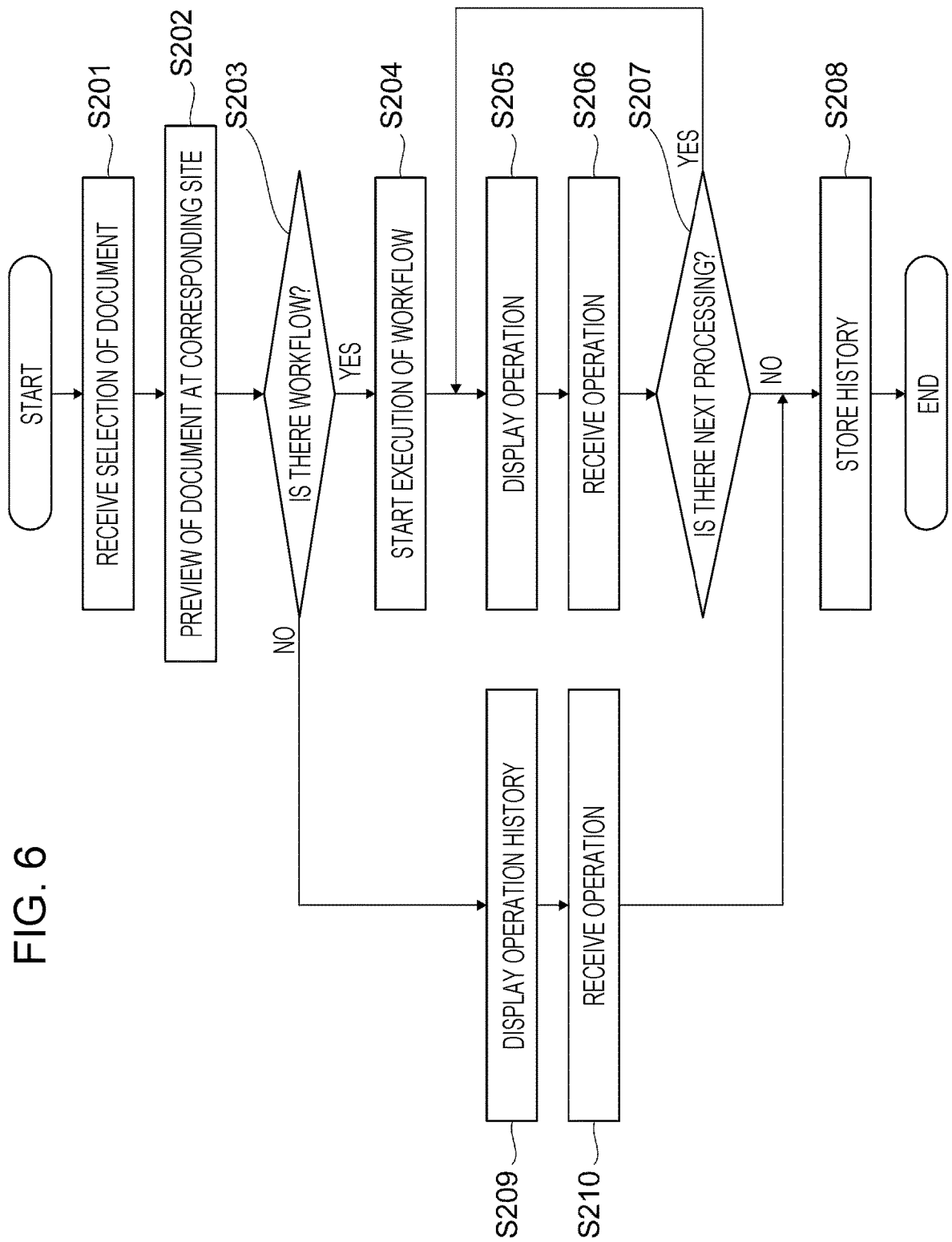
FIG. 6 is a flowchart illustrating actual processing in a display unit.

FIG. 6 is a flowchart illustrating the actual processing in the display unit 25.

As illustrated in FIG. 6, when selection of a document is received (step 201), the documents in a site corresponding to the document of the received selection are previewed (step 202).

The receiving of document selection referred to herein is that a reception image for receiving instructions of a user for a document stored in one of the later-described tray icons 51 to 53 (see FIG. 7) is displayed by the display controller 41, and in response to the display, an operation of the user for the reception image is received. The reception image allows not only selection of a document in a tray, but also selection of a document for which new arrival notification is made. Note that a tray referred to herein may be called a holder.

It is checked whether a workflow is present for a corresponding site or one of the tray icons 51 to 53 (see FIG. 7) where documents are present (step 203). The checking whether a workflow is present is determined by whether a workflow is stored in the database 30 (see FIG. 1).

When a workflow set in advance (see FIG. 5) is present (Yes in step 203), execution of the workflow is started (step 204). Specifically, guidance is provided for predetermined processing for a document corresponding to the reception image. In this manner, when a workflow is present in the trays, an operation can be executed directly from the preview.

In the guidance, the initial operation is displayed on the display unit 25 of the terminal apparatus 20 in accordance with a workflow (step 205). When an operation of a user is performed in response to the initial operation display, the operation is received (step 206).

It is checked whether the next processing is included in the workflow (step 207), and when the next processing is included (Yes in step 207), the flow returns to step 205, and the next operation is displayed. When the next processing is not included in the workflow, in other words, when all the operations for the operation display included in the workflow are received (No in step 207), a history related to the operations is saved (step 208). Information on the history is stored in the database 30 (see FIG. 1).

When a workflow set in advance (see FIG. 5) is not present (No in step 203), an operation history is displayed (step 209), an operation is received (step 210), and the flow proceeds to step 208.

Note that information on the operation history uses the operation history for tray by tray stored in table 35 (see FIG. 11) of the database 30.

<Display in Display Unit 25>

Next, the display on the display unit 25 of the terminal apparatus 20 will be described.

In the exemplary embodiment, the CPU 11a (see FIG. 2) as an example of a processor provided in the server apparatus 10 generates information which is used to control the display of the display unit 25 provided in the terminal apparatus 20. The terminal apparatus 20 performs display control according to the information. Thus, various screens described below are displayed on the display unit 25 of the terminal apparatus 20.

Note that the terminal apparatus 20 instead of the server apparatus 10 may generate the information which is used to control the display of the display unit 25 of the terminal apparatus 20. Alternatively, part of the information used for the control may be generated by the server apparatus 10, and the remaining part of the information may be generated by the terminal apparatus 20.

FIG. 7 is a view illustrating a display example of the display unit 25.

As illustrated in FIG. 7, the display unit 25 provided in the terminal apparatus 20 displays the workspace 500 on so-called file handling software.

The file handling software manages computerized files, and has a function of promoting unified management of paper and electronic documents.

The display unit 25 further displays the cursor 501 that indicates a position of operation by a user. The cursor 501 is moved according to the operation of a mouse by a user.

A user moves the cursor 501 to a desired position of the display unit 25, and selects an element displayed on the display unit 25.

In the display example illustrated in FIG. 7, workspace W is displayed on the display unit 25 as the workspace 500, and the tray icons 51, 52, 53 are displayed on the workspace W. The tray icons 51 to 53 are images displayed corresponding to respective elements selectable by a user, and are displayed on the display unit 25.

A picture, a symbol and/or character information are displayed in the tray icons 51 to 53. Each of the tray icons 51 to 53 may be called a thumbnail image.

The tray icons 51 to 53 are sequentially labeled with tray names "Tray A", "Tray B", and "Tray C", respectively. A user can store a file in each of the tray icons 51 to 53, and a file obtained by receiving it is automatically added to a specified one of the tray icons 51 to 53.

In the exemplary embodiment, as described above, for each of the tray icons 51 to 53, processing for the files stored therein can be set in advance. The tray icons 51 to 53 of the workspace W provide an example of a storage.

As a further description, a setting screen and a guidance screen are displayed on the workspace W according to an operation of a user, and notification is displayed according to reception of a file.

In addition, file icons indicating the files stored in the tray icons 51 to 53 are displayed on the workspace W, and quick view for performing processing without opening the file icons is displayed. The details will be described below.

When instructions for enlargement are received from a user, enlarged images are displayed on the workspace W.

Next, the screens for the first processing setting (see step 102 of FIG. 5), the second processing setting (see step 103 of FIG. 5) displayed on the workspace W of the display unit 25, and for setting (see step 104 of FIG. 5) of a workflow will be described with reference to FIG. 8, FIG. 9 and FIG. 10. The setting is made by an administrator, or may be made by a user.

Figure 8:
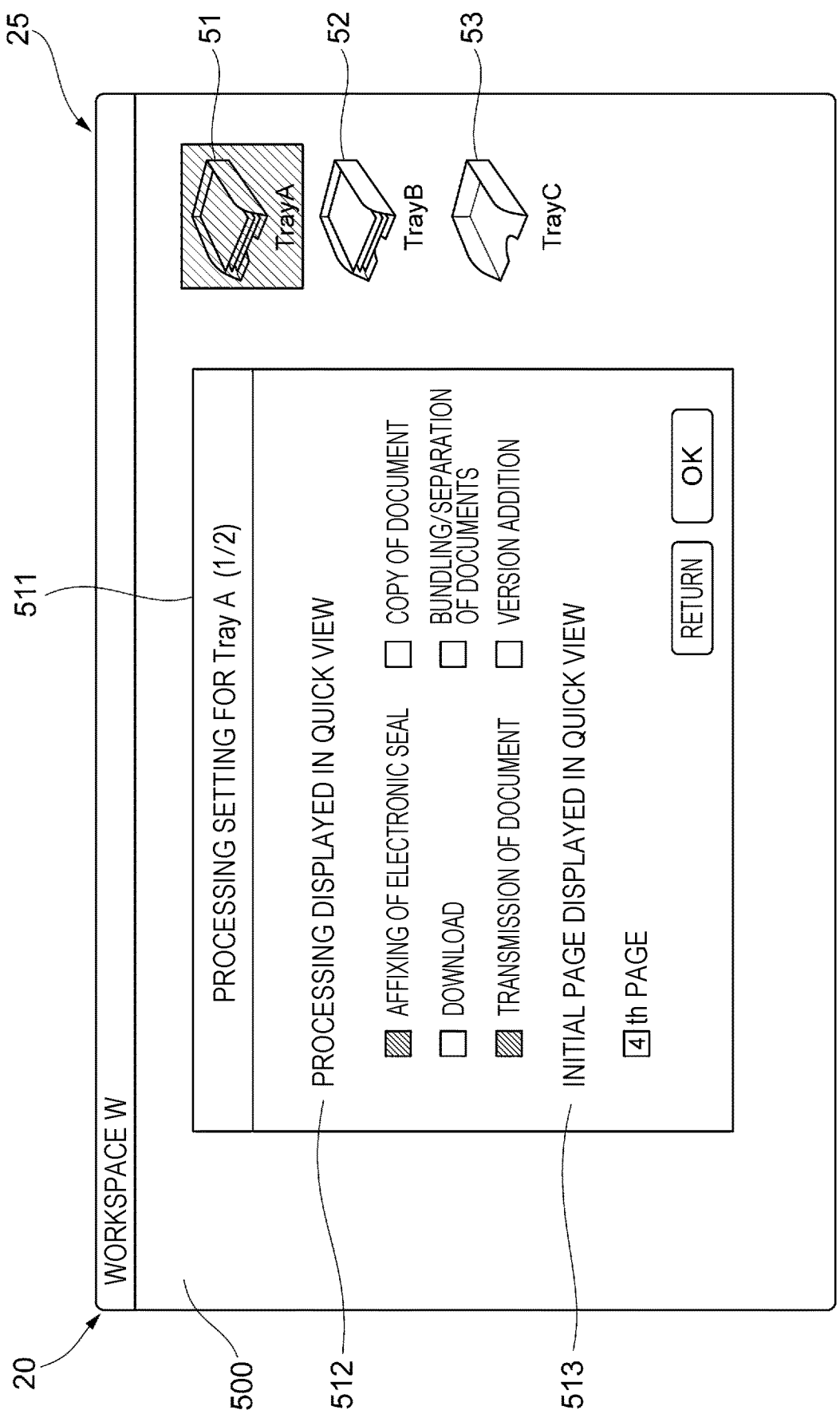
FIG. 8 is a view illustrating a screen example of a first processing setting displayed on a workspace.

FIG. 8 is a view illustrating a screen example of the first processing setting displayed on the workspace W.

As illustrated in FIG. 8, when the tray icon 51 having a tray name "Tray A" is selected, and specification instructions for processing setting are given, setting screen 511 of "PROCESSING SETTING FOR Tray A (1/2)" as an example of the first processing setting is displayed on the display unit 25.

That is, the display unit 25 illustrated in FIG. 8 shows the case where the tray icon 51 having a tray name "Tray A" is selected by the cursor 501 (see FIG. 7), and instructions for setting are given, thus the setting screen 511 is first displayed on the workspace W.

The setting screen 511 has an expression of "PROCESSING SETTING FOR Tray A (1/2)", area 512 for displaying and selecting items as "PROCESSING DISPLAYED IN QUICK VIEW", and area 513 for specifying "INITIAL PAGE DISPLAYED IN QUICK VIEW". In addition, the setting screen 511 has OK button for giving instructions to proceed to the next, and RETURN button for giving instructions to return to the previous screen.

In the area 512, items and radio buttons some of which are checked when some items are selected are displayed. When a radio button is checked, a corresponding item is in a selected state, and when a radio button is not checked, a corresponding item is in a non-selected state.

In the example of FIG. 8, six items and six radio buttons corresponding to these items are placed. As the items on the left side between two rows, "AFFIXING OF ELECTRONIC SEAL", "DOWNLOAD" and "TRANSMISSION OF DOCUMENT" are sequentially arranged from the top to the bottom, and as the items on the right side, "COPY OF DOCUMENT", "BUNDLING/SEPARATION OF DOCUMENTS" and "VERSION ADDITION" are arranged.

The item, "AFFIXING OF ELECTRONIC SEAL" is for processing to affix an electronic seal to a document of interest which is a document stored in "Tray A". In addition, "COPY OF DOCUMENT" is processing to copy a document of interest, and "DOWNLOAD" is processing to download a document of interest to the self-apparatus, in other words, the terminal apparatus 20 (see FIG. 1). Furthermore, "BUNDLING/SEPARATION OF DOCUMENTS" is processing to edit documents of interest by bundling or separating them page by page, "TRANSMISSION OF DOCUMENT" is processing to electronically transmit a document of interest, and "VERSION ADDITION" is processing to add the version of a document of interest.

A user performs an operation to check the radio button for each processing desired to be displayed in quick view, and does not check the radio button for each processing which is not desired to be displayed. The state shown in FIG. 8 is such that the radio buttons respectively corresponding to the two items of "AFFIXING OF ELECTRONIC SEAL" and "TRANSMISSION OF DOCUMENT" are checked, and the radio buttons corresponding to other items are not checked.

The area 513 includes an input column for specifying page number, and an expression "PAGE" subsequent to the input column. When processing for the files stored in the tray icon 51 is to be performed on a predetermined page, the page is displayed on the workspace W or the processing is performed on the page by entering the page number to the input column.

Figure 9:
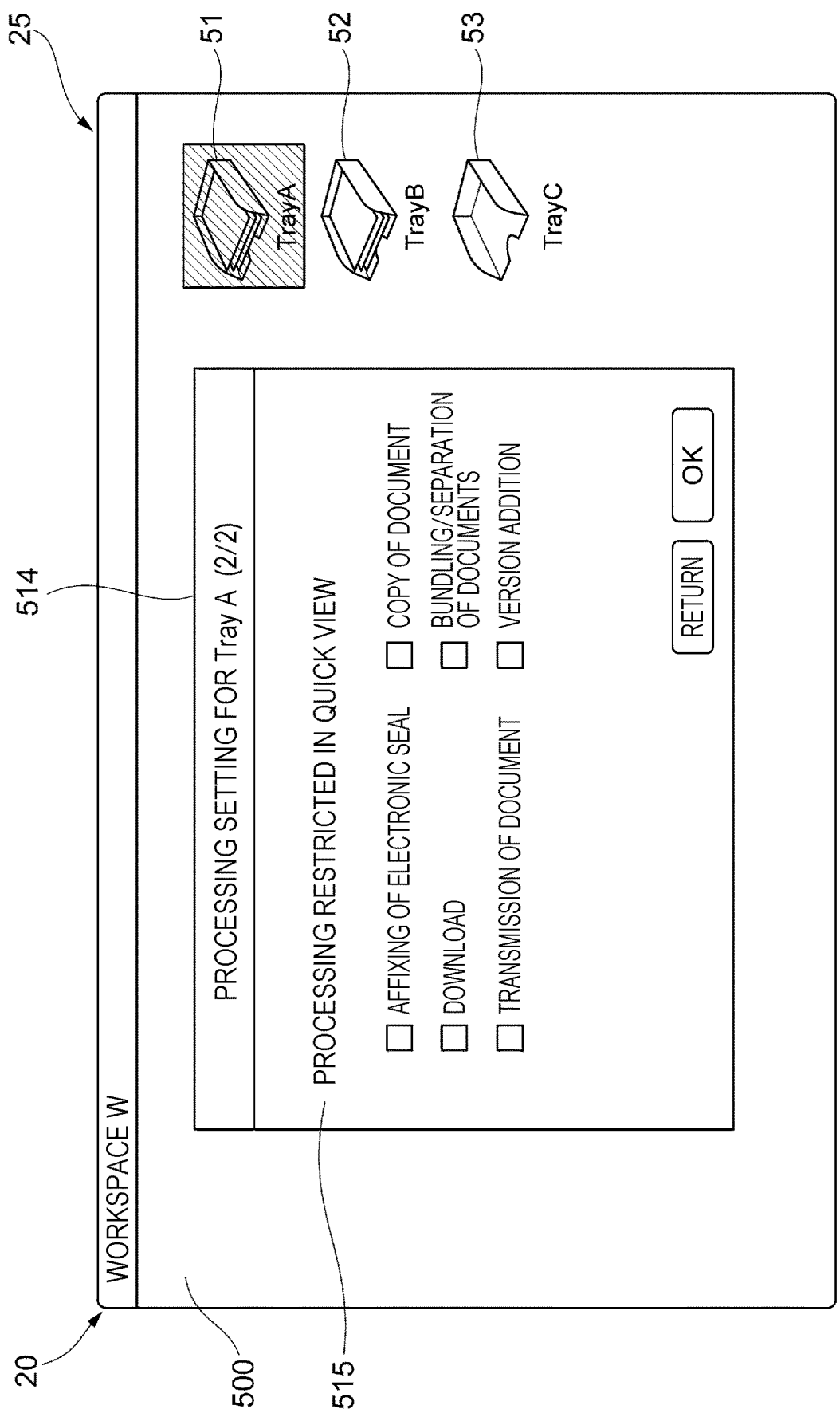
FIG. 9 is a view illustrating a screen example of a second processing setting displayed on the workspace.

FIG. 9 is a view illustrating a screen example of the second processing setting displayed on the workspace W. An operation for the OK button (see FIG. 8) on the first processing setting screen causes setting screen 514 for "Tray A" to be subsequently displayed.

Here, "display/non-display" in the first processing setting is for selecting an item to be displayed initially in quick view. An item which is set to "non-display" in the first processing setting is displayed by pressing, for example, "all processing button" (not illustrated), and may be represented by a short-cut icon.

In contrast, "restricted/unrestricted" in the second processing setting is setting to allow a user to use an item or not to allow a user to use an item in quick view, and a "restricted" item is not displayed even if the above-mentioned "all processing button" (not illustrated) is pressed.

The setting screen 514 illustrated in FIG. 9 has an expression of "PROCESSING SETTING FOR Tray A (2/2)", and area 515 for displaying and selecting items as "PROCESSING RESTRICTED IN QUICK VIEW". As in the setting screen 511 (see FIG. 8), the setting screen 514 has OK button and RETURN button.

In the area 515, the same items and radio buttons as in the area 512 are displayed. A user checks the radio button for each processing desired to be inhibited from being executed and to be restricted in quick view, and does not check each processing desired to be unrestricted.

In the area 515 illustrated in FIG. 9, any radio button is in an unchecked state.

Figure 10:
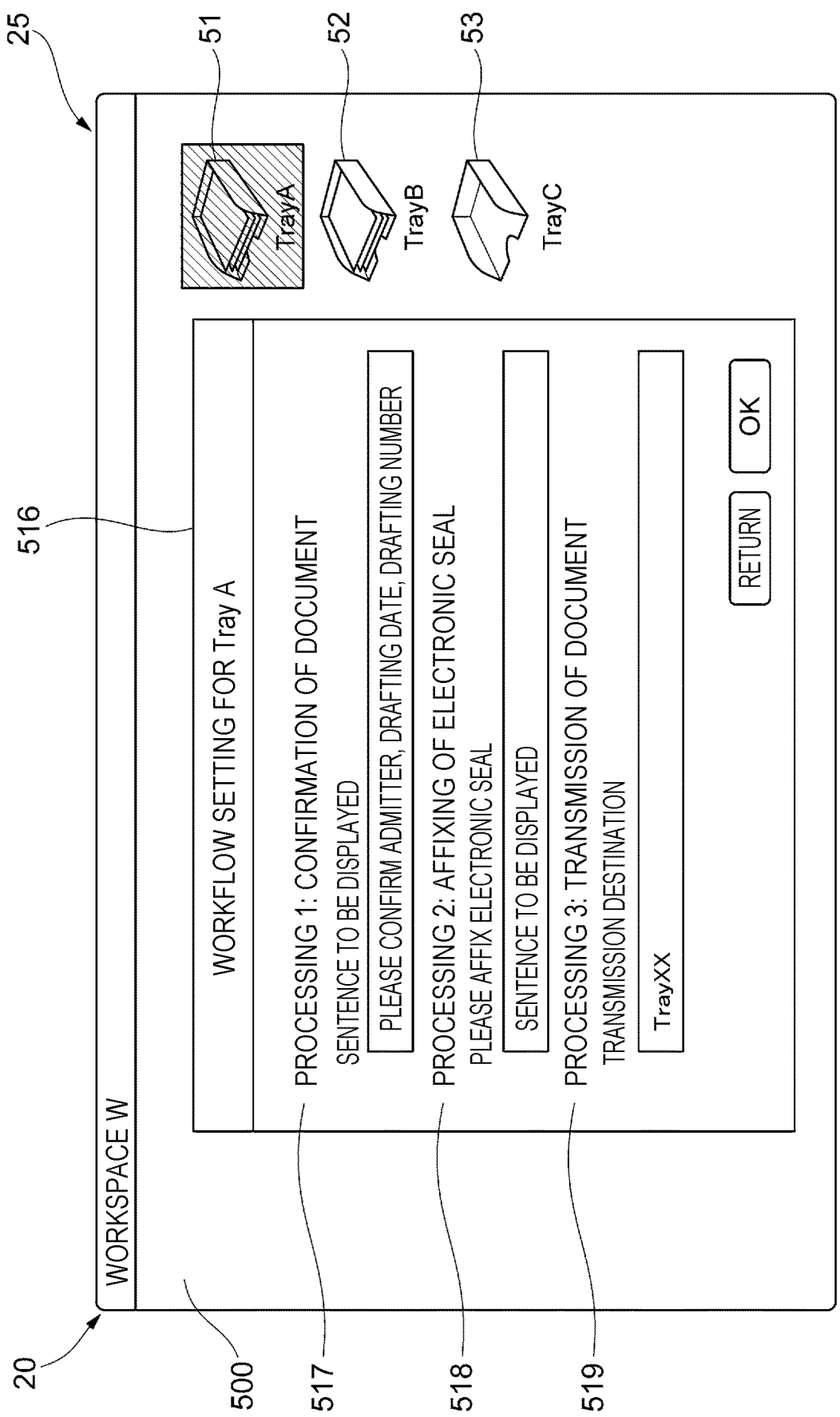
FIG. 10 is a view illustrating a screen example of a workflow setting displayed on the workspace.

FIG. 10 is a view illustrating a screen example of a workflow setting displayed on the workspace W. An operation for the OK button (see FIG. 9) on the second processing setting screen causes setting screen 516 for "Tray A" to be subsequently displayed.

The setting screen 516 illustrated in FIG. 10 has an expression of "WORKFLOW SETTING FOR Tray A", area 517 for "PROCESSING 1: CONFIRMATION OF DOCUMENT", area 518 for "PROCESSING 2: AFFIXING OF ELECTRONIC SEAL", and area 519 for "PROCESSING 3: TRANSMISSION OF DOCUMENT". As in the setting screen 511 (see FIG. 8), the setting screen 516 has OK button and RETURN button.

In the area 517, a field to enter a sentence to be displayed for the processing 1 at the time of execution of a workflow is placed. In FIG. 10, a sentence, "PLEASE CONFIRM ADMITTER, DRAFTING DATE, DRAFTING NUMBER" has been entered.

In the area 518, a field to enter a sentence to be displayed for the processing 2 is placed. In the field, a sentence, "PLEASE AFFIX ELECTRONIC SEAL" has been entered.

In the area 519, a field to enter a sentence to be displayed for the processing 3 is placed, and in the field, a sentence, "Tray XX" has been entered. Although one transmission destination is entered in the area 519, multiple transmission destinations may be entered and a user may be allowed to select one of them at the time of execution of a workflow.

In this manner, in the workflow setting illustrated in FIG. 10, a series of processing is designed to be executed: a document of interest, which is a target of the workflow, is confirmed, an electronic seal is affixed to the confirmed document of interest, and the document of interest with an electronic seal affixed is transmitted to "Tray XX".

Note that information on the setting (see FIG. 8, FIG. 9) on the first processing setting screen and the second processing setting screen described above, and information on the setting (see FIG. 10) of the workflow are stored in the database 30 (see, for example, FIG. 1).

The setting for the tray icon 51 named "Tray A" has been described with reference to FIG. 8, FIG. 9 and FIG. 10, and similar setting may also be made for the tray icons 52, 53. In other words, the respective settings for the tray icons 51 to 53 may be made different from each other.

As a further description, in the example illustrated in FIG. 8 and FIG. 9, extraction is made from the processing which is set to be displayed/restricted in quick view; however, without being limited to this, the processing to be displayed/restricted in quick view may be set automatically based on the operation history (the operation history illustrated in the table 35 of FIG. 11) of the documents stored in the tray icons 51 to 53, or alternatively, may be set manually by a user.

In addition, the respective settings for the tray icons 51 to 53 may be made by a user regarding a workflow, in other words, regarding the operation contents and operation order of multiple operations.

Furthermore, the setting made for each of the tray icons 51 to 53 is one per tray icon; however, without being limited to this, multiple settings may be made for each tray icon. In this case, when the quick view area 62 (see FIG. 13) is displayed, a user may be allowed to select which setting is to be made.

Next, examples of information stored in the database 30 will be described with reference to FIG. 11.

Figure 11:
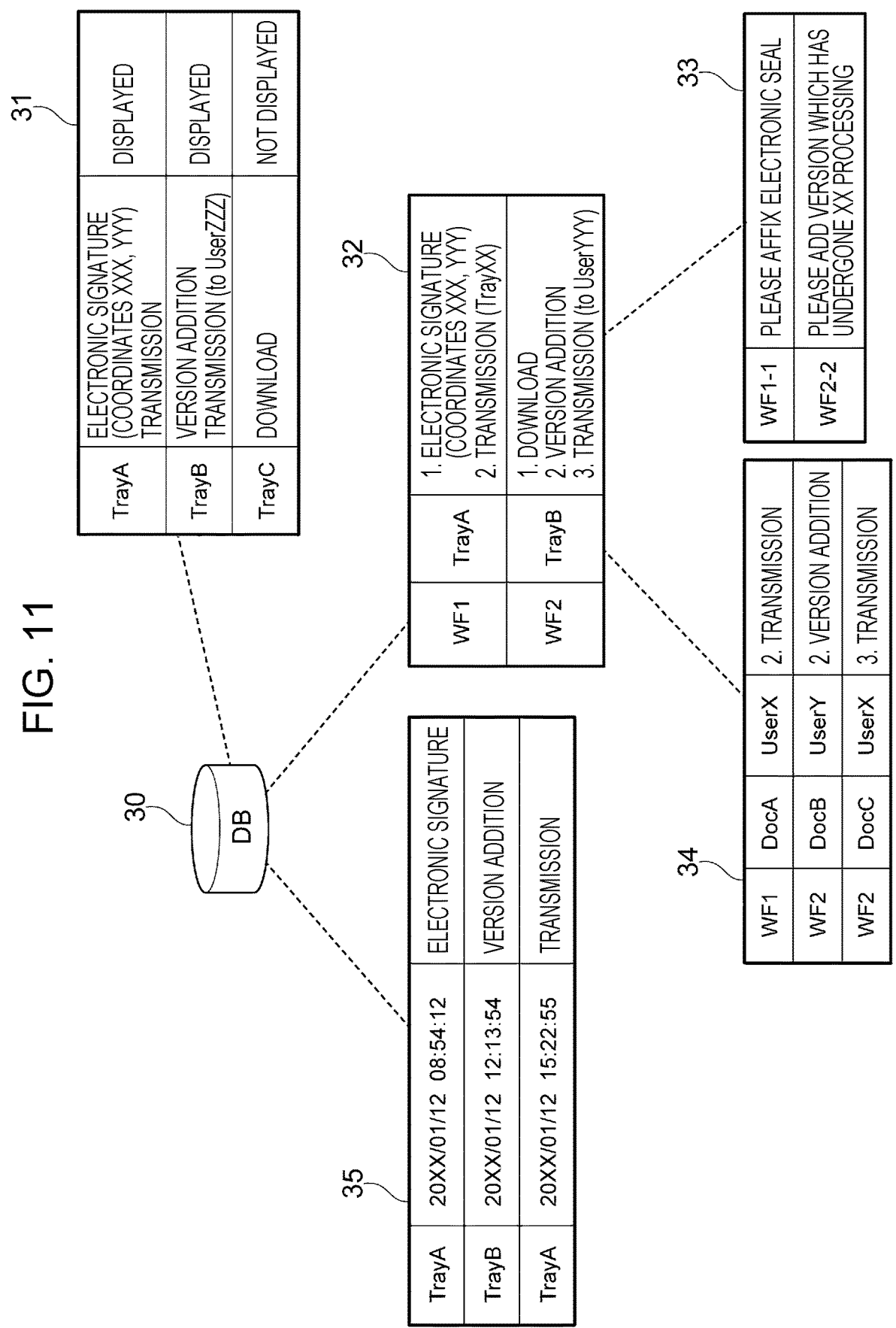
FIG. 11 is a chart for explaining information examples stored in a database.

FIG. 11 is a chart for explaining information examples stored in the database 30.

As illustrated in FIG. 11, the database 30 stores table 31 showing the operation setting for site by site, table 32 showing the workflow setting for site by site, table 33 showing a detailed description, table 34 showing the progress of a workflow, and table 35 showing the operation history for site by site.

The tables 31 to 35 will be described in detail.

The table 31 stores information on the operation setting for site by site. Specifically, the table 31 stores information on the operation setting for "Tray A" corresponding to the tray icon 51 (see, for example, FIG. 7), "Tray B" corresponding to the tray icon 52 (see, for example, FIG. 7), and "Tray C" corresponding to the tray icon 53 (see, for example, FIG. 7).

More specifically, for the "Tray A", information on the operation setting of "ELECTRONIC SIGNATURE (COORDINATES XXX, YYY) TRANSMISSION", and information on the setting of "DISPLAYED" are stored. In addition, information on the setting of "VERSION ADDITION TRANSMISSION (to User ZZZ)" and "DISPLAYED" for the "Tray B", and information on the setting of "DOWN-LOAD" and "NOT DISPLAYED" for the "Tray C" are stored.

The table 32 stores information on the workflow setting for site by site. Specifically, in the table 32, a workflow called "WF 1" is set to the "Tray A", and the processing content is "1. ELECTRONIC SIGNATURE (COORDINATES XXX, YYY)" and "2. TRANSMISSION (Tray XX)". The processing content of a workflow called "WF 2" set to the "Tray B" is "1. DOWNLOAD", "2. VERSION ADDITION" and "3. TRANSMISSION (to User YYY)".

The table 33 stores information on detailed description. For example, "WF 1-1" as the setting to "1. ELECTRONIC SIGNATURE (COORDINATES XXX, YYY)" of the workflow called "WF 1" stores information, "PLEASE AFFIX ELECTRONIC SEAL". In addition, "WF 2-2" as the setting to "2. VERSION ADDITION" of the workflow called "WF 2" stores information, "PLEASE ADD VERSION WHICH HAS UNDERGONE XX PROCESSING".

The table 34 stores information indicating the progress of a workflow. For example, for the workflow called "WF 1", the table 34 stores information indicating that the processing of "2. TRANSMISSION" to "Doc A" was performed by "User X". In addition, for the workflow called "WF 2", the table 34 stores information indicating that the processing of "2. VERSION ADDITION" to "Doc B" was performed by "User Y" and information indicating that the processing of "3. TRANSMISSION" to "Doc C" was performed by "User X".

In this manner, when the processing for each document is defined by a workflow, the table 34 stores the progress of the processing for the document by guidance. In this manner, when a document stored on a site is previewed, the stored information on the progress can be reflected on icon display for notifying a user of a progress status (see FIG. 16).

The table 35 stores information indicating the operation history for site by site. In "Tray A", information indicating that "ELECTRONIC SIGNATURE" was made on "20XX/01/12 08:54:12" is stored, and information indicating that "TRANSMISSION" was performed on "20XX/01/12 15:22:55" is stored. In addition, in "Tray B", information indicating that "VERSION ADDITION" was performed on "20XX/01/12 12:13:54" is stored.

For example, the information on such an operation history is used for presentation to a user when a workflow has not been set for the site of the document (see S209 of FIG. 6).

In addition, when a workflow has been set, the information may be used for presentation to a user as processing candidate (see S102, S103 of FIG. 5). In other words, the operation history of files is used in the screen display for an administrator or a user to select processing site by site of documents. Such an operation history of files may be used not only when screen display is performed with a predetermined method by the display controller 41, but also when the operation history of files is displayed on the screen as a selection candidate, and an administrator or a user selects from the operation history.

Next, the case where a workflow is executed upon triggering by notification in the workspace W will be described with reference to FIG. 12 to FIG. 15. The execution of a workflow is performed by a user.

Figure 12:
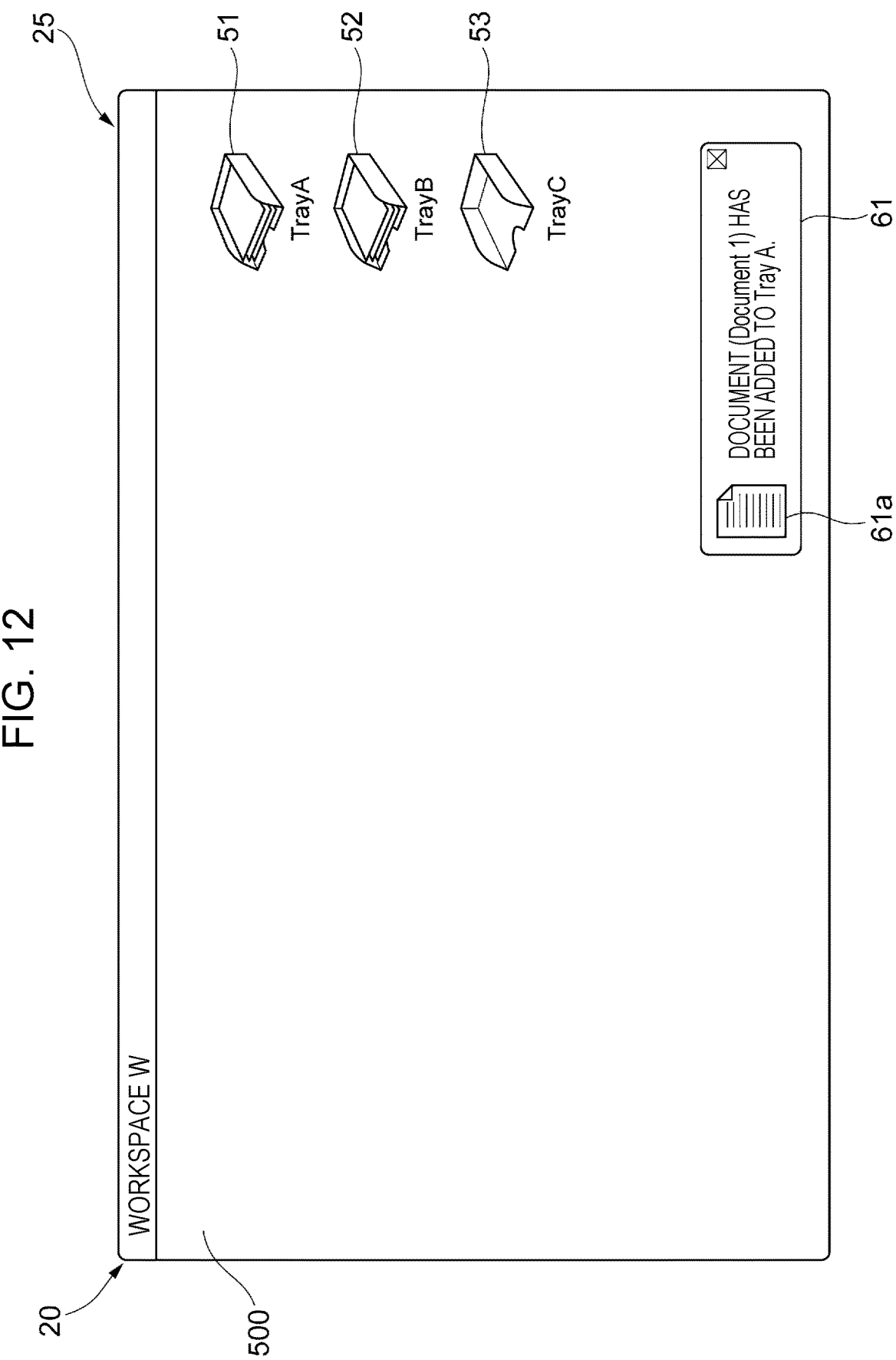
FIG. 12 is a view for explaining a situation in which a notification is made.
Figure 13:
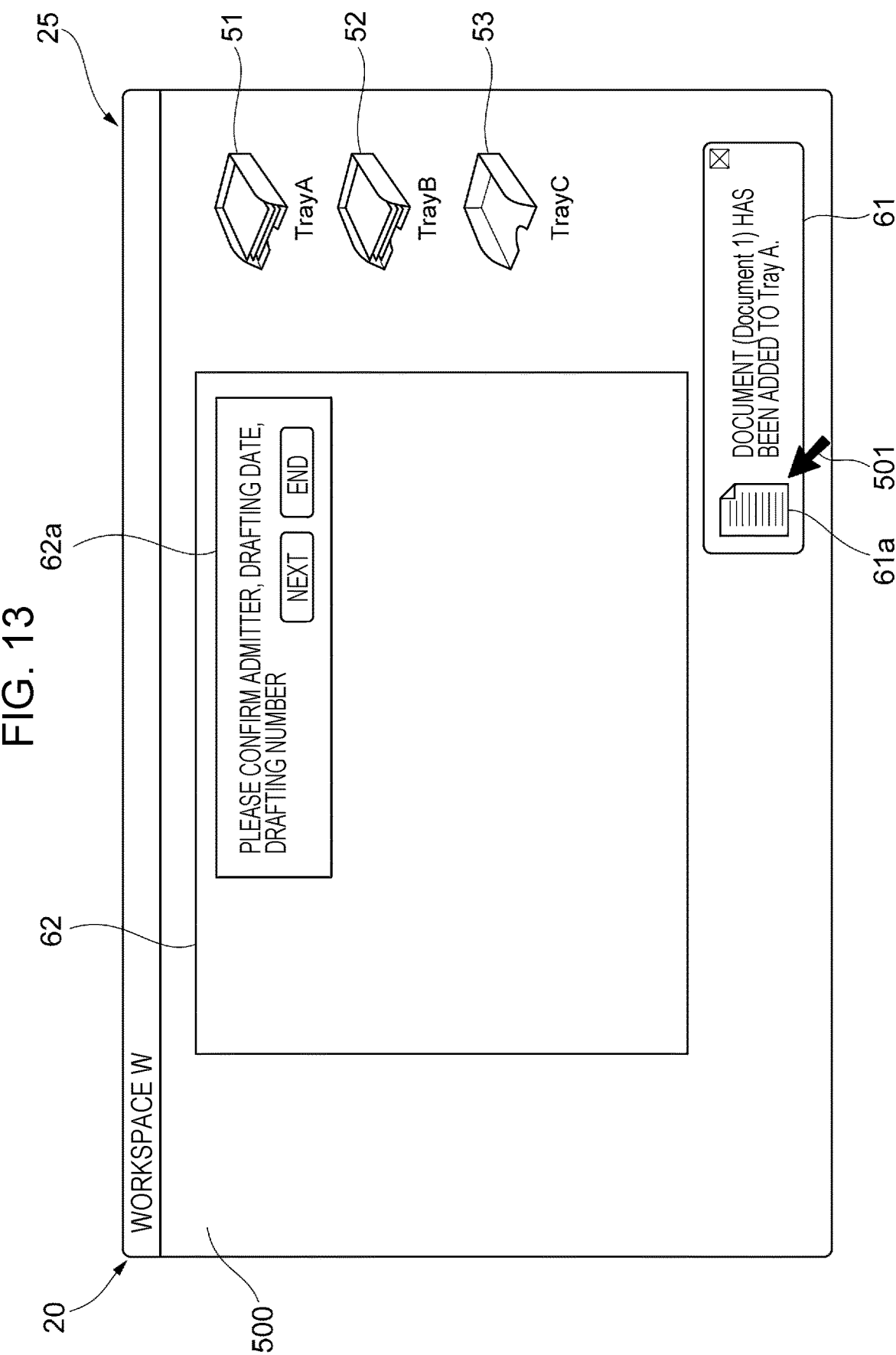
FIG. 13 is a view for explaining a situation in which processing 1 in the workflow is executed after the notification.
Figure 14:
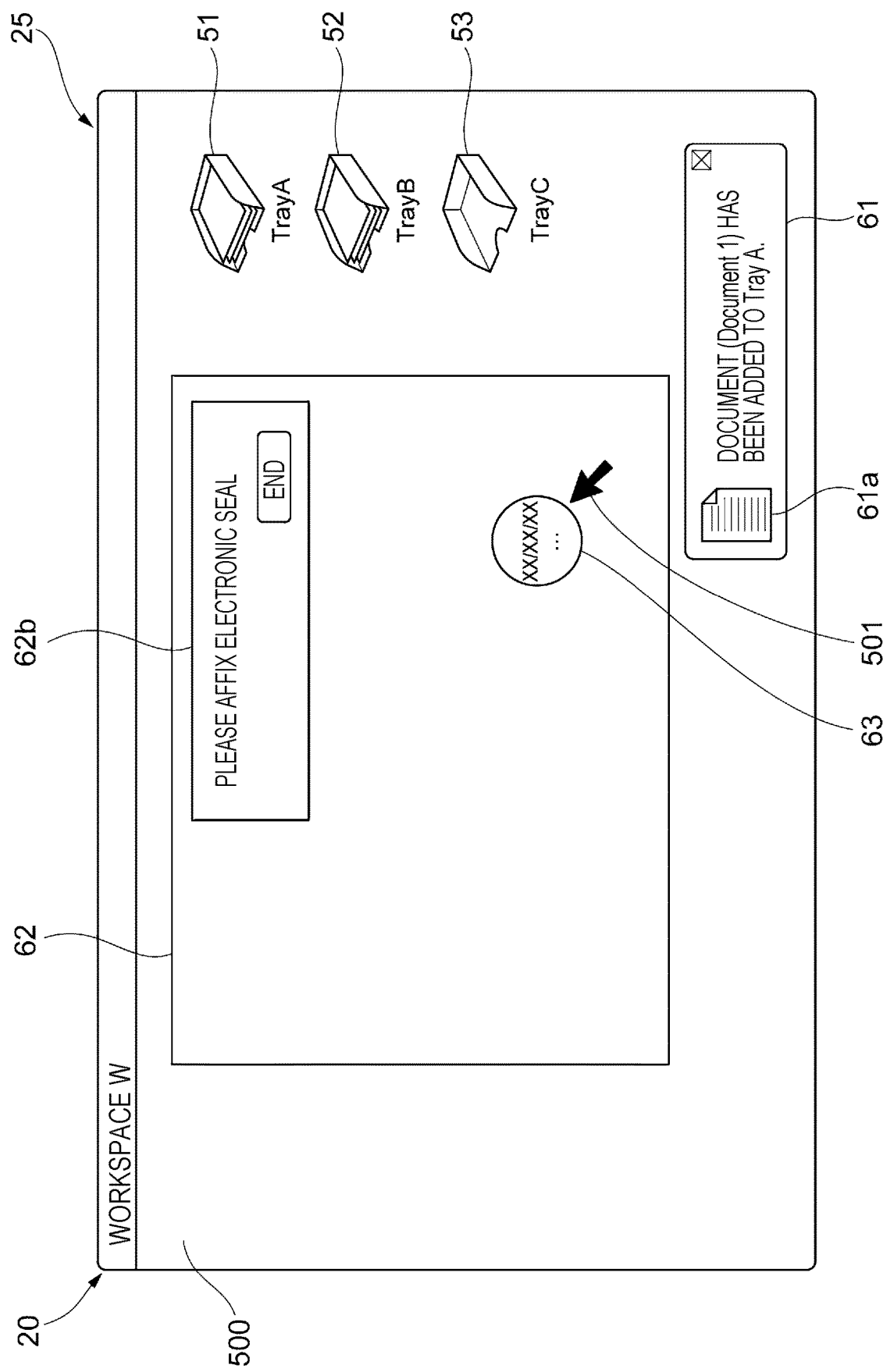
FIG. 14 is a view for explaining a situation in which processing 2 in the workflow is executed.
Figure 15:
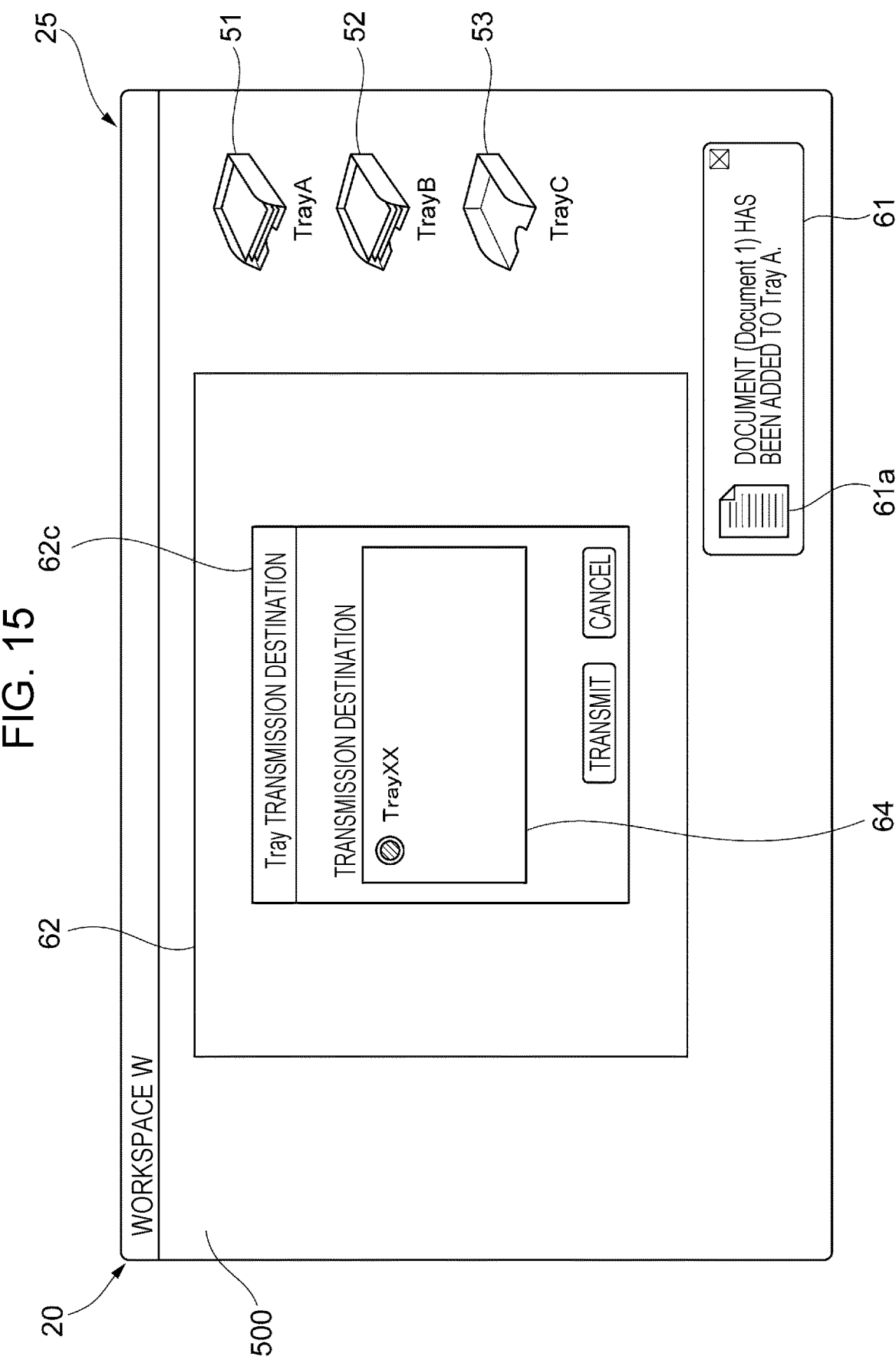
FIG. 15 is a view for explaining a situation in which processing 3 in the workflow is executed.

FIG. 12 is a view for explaining a situation in which a notification is made, and FIG. 13 to FIG. 15 are views for explaining a situation in which a workflow is executed after the notification. Specifically, FIG. 13 illustrates a situation in which processing 1 is executed, FIG. 14 illustrates a situation in which processing 2 is executed, and FIG. 15 illustrates a situation in which processing 3 is executed.

In the situation illustrated in FIG. 12, for example, in the terminal apparatus 20a (see FIG. 1), notification of addition of a document to the Tray A is made. Specifically, notification image 61 is displayed on the workspace 500 of the display unit 25. The notification image 61 is an image notified when a change is made in a site such as the tray icons 51 to 53. The example illustrated in FIG. 12 includes document 61a with a thumbnail in which the content of an added document is displayed on a reduced scale, and an expression of "DOCUMENT [Document 1] HAS BEEN ADDED TO Tray A". The document [Document 1] refers to the document 61a.

The notification image 61 is displayed upon triggering by reception of the document [Document 1] by the terminal apparatus 20a (see FIG. 1) and addition of the document [Document 1] to the specified tray. The notification image 61 is not displayed upon triggering by an operation actively performed by a user.

In FIG. 13 showing the next situation of FIG. 12, a mouse over state is achieved in which the cursor 501 is set by a user at a position overlaying on the notification image 61. Upon detection of the position of the cursor 501, the quick view area 62 is displayed.

In this manner, the quick view area 62 is displayed by performing an operation of overlaying the cursor 501 on the notification image 61 by a user. As described below, when a workflow is present for the Tray A, guidance for pre-set processing is started.

In the quick view area 62 illustrated in FIG. 13, the content (not illustrated) of the document [Document 1] added to the Tray A is displayed, and the content of a workflow corresponding to the Tray A is displayed.

In the quick view area 62 illustrated in FIG. 13, an expression corresponding to the processing 1 in the workflow is provided. Specifically, FIG. 13 illustrates guidance area 62a where explanation, "PLEASE CONFIRM ADMITTER, DRAFTING DATE, DRAFTING NUMBER.", and "NEXT" button operated when proceeding to the next screen and "END" button operated when the quick view is ended are displayed.

Note that the explanation is the sentence (see FIG. 10) entered in the processing 1 of "WORKFLOW SETTING FOR Tray A" mentioned above.

When "ADMITTER, DRAFTING DATE, DRAFTING NUMBER" are confirmed, and the "NEXT" button illustrated in FIG. 13 is pressed, an expression corresponding to the processing 2 in the workflow is provided in the quick view area 62 as illustrated in FIG. 14. Specifically, FIG. 14 illustrates guidance area 62b where explanation, "PLEASE AFFIX ELECTRONIC SEAL.", and the "END" button operated when the quick view is ended are displayed. Note that the explanation is the sentence (see FIG. 10) entered in the processing 2 of "WORKFLOW SETTING FOR Tray A" mentioned above.

In the quick view area 62 illustrated in FIG. 14, imprint 63 of an electronic seal is added to the document [Document1] by an operation of the cursor 501. The imprint 63 includes date (xx/xx/xx) and full name ( . . . ). Thus, the processing 2 is completed, and the flow proceeds to the next processing 3.

In the quick view area 62 illustrated in FIG. 15, an expression corresponding to the processing 3 in the workflow is provided. Specifically, FIG. 15 illustrates guidance area 62c where an expression of "Tray TRANSMISSION DESTINATION", expression 64 showing a transmission destination candidate, "TRANSMISSION" button operated when a document is transmitted and "CANCEL" button operated when a document is not transmitted are displayed.

The expression 64 includes "Tray XX" which is a transmission destination candidate, and a check box corresponding to the transmission destination candidate. Note that the transmission destination candidate is the sentence (see FIG. 10) entered in the processing 3 of "WORKFLOW SETTING FOR Tray A" mentioned above.

When the "TRANSMISSION" button of FIG. 15 is pressed, the document [Document 1] with an electronic seal affixed in the Tray A is transmitted to "Tray XX".

In this manner, when the notification image 61 of "DOCUMENT [Document 1] HAS BEEN ADDED TO Tray A" is displayed, mouse over of the cursor 501 operated by a user with respect to the notification image 61 causes the processing for the document [Document 1] to be executed in accordance with the workflow for the Tray A, thus the operation burden of the user is reduced.

Here, the notification image 61 (see, for example, FIG. 12) is an image to receive the instructions of a user, called mouse over, for the document 61a stored in the tray icon 51, and is an example of a reception image. The document 61a is an example of a file.

The guidance area 62a (see FIG. 13), the guidance area 62b (see FIG. 14), and the guidance area 62c (see FIG. 15) which are displayed in the quick view area 62 show images used when guidance is provided for processing in a predetermined workflow for the tray icon 51 (see one of FIG. 12 to FIG. 15), the processing for the document 61a that is the document [Document 1] corresponding to the notification image 61. These guidance areas provide an example of a guidance image.

As a further description, the guidance area 62a is displayed along with the notification image 61 (see FIG. 13). In addition, the guidance area 62b is displayed along with the notification image 61 (see FIG. 14), and the guidance area 62c is displayed along with the notification image 61 (see FIG. 15). The guidance areas 62a to 62c are displayed so as not to overlap with the notification image 61 (see FIG. 13 to FIG. 15). Note that the guidance areas 62a to 62c and the notification image 61 may be displayed so as to partially overlap with each other.

The processing for which guidance is provided by the guidance areas 62a to 62c consists of the processing 1 that is "CONFIRMATION OF DOCUMENT", the processing 2 that is "AFFIXING OF ELECTRONIC SEAL", and the processing 3 that is "TRANSMISSION OF DOCUMENT" (see, for example, FIG. 10), and these processing is part of the processing that is predetermined as "PROCESSING DISPLAYED IN QUICK VIEW" (see, FIG. 8) for the tray icon 51.

As a further description, the processing checked in "PROCESSING RESTRICTED IN QUICK VIEW" (see, FIG. 9) for the tray icon 51 is processing for which execution is restricted, and no guidance is provided for the processing.

Therefore, the part of the above-mentioned predetermined processing does not include the processing for which execution is restricted. In other words, the part of the processing includes executable processing and processing to be executed, which are processing not checked.

Next, the case where a workflow is executed upon triggering by quick view from the document list in the "Tray A" will be described with reference to FIG. 16.

FIG. 16 is a view for explaining a situation in which a document list is displayed.

In the situation illustrated in FIG. 16, document list area 71 showing the list of documents in the tray icon 51 is displayed by overlaying the cursor 501 on the tray icon 51 in the workspace 500.

In this manner, in addition to the case where guidance in accordance with a workflow is provided upon triggering by display of the notification image 61, similar guidance is also provided upon quick view from the document list of a tray. As an additional remark, in the case illustrated in FIG. 16, the document list area 71 is displayed by an operation actively performed by a user. In this regard, the document list area 71 illustrated in FIG. 16 is different from the case of the notification image 61 illustrated in FIG. 13 to FIG. 15.

As a further description, the document list area 71 shows documents 71a to 71f displayed on a reduced scale, which represent the files stored in the "Tray A".

In addition, the progress of processing or a checkmark icon showing the degree of progress is added to the document 71c and the document 71d between the documents 71a to 71f. A checkmark icon is not added to other documents 71a and 71b, 71e and 71f. In this manner, information showing the degree of progress for each of the documents 71a to 71f is stored in the table 34 (see FIG. 11) of the database 30, thus a user can be informed of the degree of progress. When a workflow with predetermined operation contents and operation order of multiple operations is completed half way through, the workflow can be smoothly restarted half way through by paying attention to these checkmarks.

Although one kind of checkmark icon is used in FIG. 16, multiple kinds of checkmarks each indicating a completed stage of a workflow may be used.

The cursor 501 is overlaid on the document 71f in the document list area 71 illustrated in FIG. 16, thereby causing the quick view area 72 to be displayed on the workspace 500.

In the quick view area 72, the guidance area 72a for the document 71f is shown. The guidance area 72a is the same as the guidance area 62a (see FIG. 13) described above, thus a description thereof is omitted.

When the situation of FIG. 16 proceeds to the next situation, the same guidance as in the above-mentioned guidance areas 62b, 62c (see FIG. 14, FIG. 15) is provided, thus description and illustration thereof are omitted.

Here, the document list area 71 illustrated in FIG. 16 shows images to receive mouse over instructions of a user for the document 71f between the documents 71a to 71f stored in the tray icon 51, and these images provide an example of a reception image. The documents 71a to 71f provide an example of files.

The guidance area 72a in the quick view area 72 illustrated in FIG. 16 shows an image used when guidance is provided for processing in a predetermined workflow for the tray icon 51, the processing for the document 71f corresponding to the document list area 71, and the image is an example of a guidance image.

As a further description, the guidance area 72a is displayed along with the document list area 71 (see FIG. 16). In addition, the guidance area 72a is displayed so as not to overlap with the document list area 71 (see FIG. 16).

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a display; and
   a processor configured to:
   display, on a first area of the display, a plurality of icons corresponding to a plurality of storages for storing files,
   upon receiving an operation over a first icon among the plurality of icons, display, on the first area, a reception image corresponding to a file stored in a first storage corresponding to the first icon, and
   upon receiving instructions of a user for the reception image, display, on a second area of the display that does not overlap the first area, a guidance message guiding a flow of processing which is predetermined for the first storage and which is applied to all files stored in the first storage including the file corresponding to the reception image, wherein
   the guidance message guides the flow of processing on the file in accordance with a degree of progress of the flow of processing on the file, and
   a respective flow of processing is separately settable for each of the plurality of storages.

2. The information processing apparatus according to claim 1,
   wherein the guidance message provides a guidance on a certain processing that is a part of the predetermined flow of processing.

3. The information processing apparatus according to claim 2,
   wherein the certain processing is to be executed on the file.

4. The information processing apparatus according to claim 2,
   wherein the certain processing is a processing whose execution on the file is restricted.

5. The information processing apparatus according to claim 1,
   wherein setting the predetermined flow of processing for the first storage is made based on an operation history of the file.

6. The information processing apparatus according to claim 5,
   wherein setting the predetermined flow of processing for the first storage is made by a user retrieving an operation from the operation history of the file.

7. The information processing apparatus according to claim 1,
   wherein setting the predetermined flow of processing for the first storage is made by a user regarding operation contents and an operation order of a plurality of operations.

8. The information processing apparatus according to claim 1,
   wherein setting the respective flow of processing for the plurality of storages includes providing a plurality of settings selectable by a user for each storage.

9. The information processing apparatus according to claim 1,
   wherein a guidance image which is an image in which the guidance message is provided is displayed along with the reception image.

10. The information processing apparatus according to claim 9,
    wherein the guidance image is displayed so as not to overlap with the reception image.

11. The information processing apparatus according to claim 1,
    wherein when operation contents and an operation order of a plurality of operations are predetermined for the processing for the file, the guidance message indicates the degree of progress in the operation contents and the operation order of the plurality of operations on the file.

12. The information processing apparatus according to claim 11,
    wherein an icon indicating the degree of progress is added to the reception image corresponding to the file.

13. A non-transitory computer readable medium storing a program causing an information processing apparatus to implement a process comprising:
    displaying, on a first area of a display, a plurality of icons corresponding to a plurality of storages for storing files;
    upon receiving an operation over a first icon among the plurality of icons, displaying, on the first area, a reception image corresponding to a file stored in a first storage corresponding to the first icon; and
    upon receiving instructions of a user for the reception image, displaying, on a second area of the display that does not overlap the first area, a guidance message guiding a flow of processing which is predetermined for the first storage and which is applied to all files stored in the first storage including the file corresponding to the reception image, wherein
    the guidance message guides the flow of processing on the file in accordance with a degree of progress of the flow of processing on the file, and
    a respective flow of processing is separately settable for each of the plurality of storages.

14. An information processing method comprising:
    displaying, on a first area of a display, a plurality of icons corresponding to a plurality of storages for storing files;
    upon receiving an operation over a first icon among the plurality of icons, displaying, on the first area, a reception image corresponding to a file stored in a first storage corresponding to the first icon; and
    upon receiving instructions of a user for the reception image, displaying, on a second area of the display that does not overlap the first area, a guidance message guiding a flow of processing which is predetermined for the first storage and which is applied to all files stored in the first storage including the file corresponding to the reception image, wherein
    the guidance message guides the flow of processing on the file in accordance with a degree of progress of the flow of processing on the file, and a respective flow of processing is separately settable for each of the plurality of storages.

\* \* \* \* \*